May 6, 1958     W. C. KNEELING     2,833,680
METHOD FOR MAKING OPTICAL LAMINATIONS
Filed Jan. 30, 1956
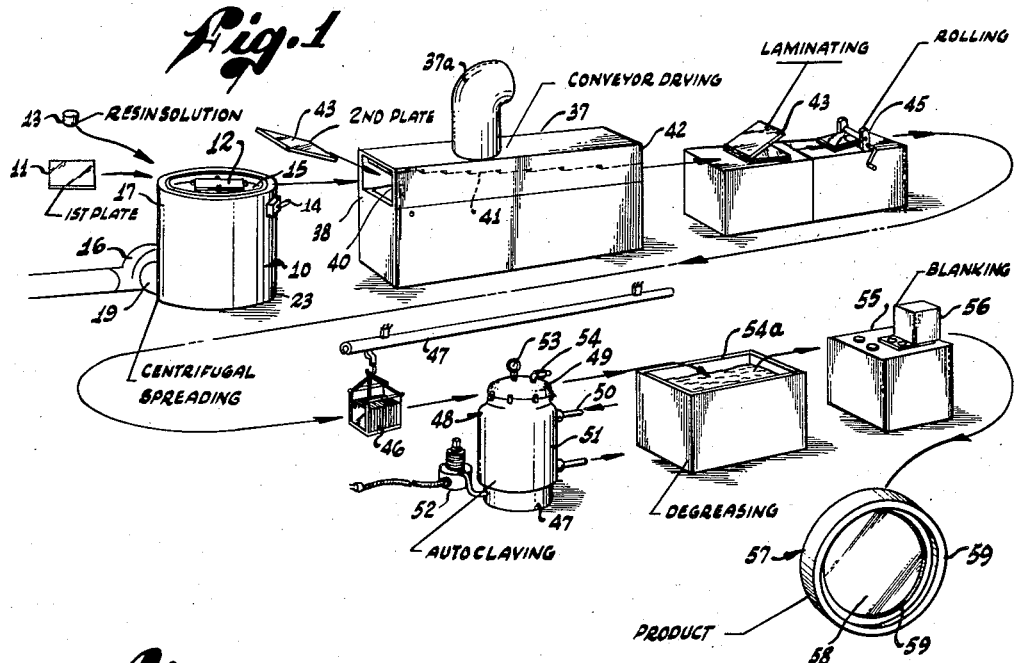
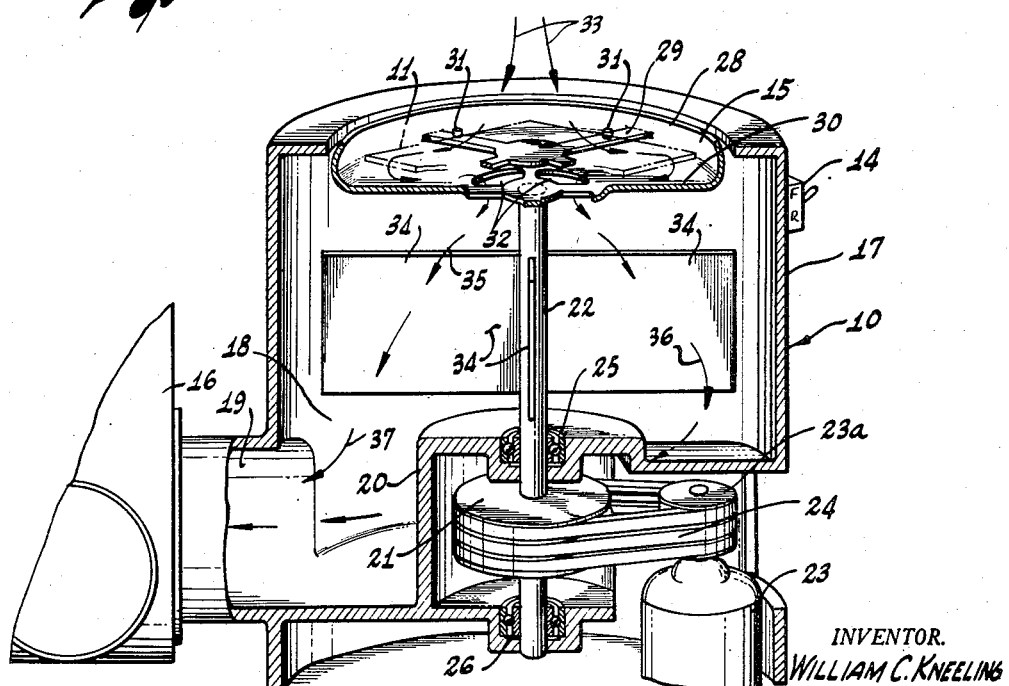
INVENTOR.
WILLIAM C. KNEELING
BY
ATTORNEYS

United States Patent Office 2,833,680
Patented May 6, 1958

2,833,680

METHOD FOR MAKING OPTICAL LAMINATIONS

William C. Kneeling, Los Angeles, Calif.

Application January 30, 1956, Serial No. 562,186

15 Claims. (Cl. 154—2.65)

This invention relates generally to methods for making optical laminations in which a pair of optical elements (usually glass plates) are bonded together by means of an interlayer of plastic, and more particularly, to such a process in which a solution of resin and plasticizer is poured onto the center of one of the plates, and, before its outward flow has stopped, is spread over the plate by centrifugal force while at the same time air (or other entraining gas) is pumped away from the edges of the whirling plate in order to remove threads or droplets of plastic thrown off by centrifugal action. In this process, a vinyl resin is preferred, and the two plates are preferably bonded at temperatures above the boiling point of water and at pressures of at least 150 pounds per square inch.

Laminated glass has found its greatest utility in the fields of photographic filters and automobile safety glass. While the present invention can be used to fabricate panes of laminated glass with a thin interlayer of plastic of sufficient strength to function as light-weight safety glass, the invention finds its principal application in the manufacture of filters and other optical elements. Prior to the discovery of methods of making plastic resin interlayers for laminated glass, photographic filters were commonly made of a piece of dyed gelatin film cemented between two plane-parallel glass plates. These were subject to certain disadvantages, including a liability to damage from moisture or moderate heating, and a tendency to fade. Plastic laminated glass has proven to be much more durable, but the gelatin filters have not been entirely displaced because methods of making laminated glass of optical quality and with a desired predetermined spectrophotometric curve have involved such skill and uncertainty that production has been costly and subject to a high spoilage rate.

Some methods of making laminated glass, for instance those used to make safety glass, involve the use of a plastic lamination too thick for optical purposes. It is important in optical lenses and filters that the interlayer of plastic be only a few ten thousandths of an inch thick and that it be very uniform and free of any bubbles or surface irregularities.

Other methods have produced thin plastic interlayers, but have required successively coating the lamination plate with different materials, or coating both adjacent surfaces of the lamination plates. Some such processes have involved complex equipment and procedures to prevent the plastic coating from being marred by drops or strings of the plastic material, or ripples in the coating itself.

Glass laminations produced by some previously known methods have tended to develop defects if exposed to temperatures of a 150° to 200° F. Optical elements are sometimes subjected to such temperatures by exposure to the rays of the sun, or if used in a projector, by the heat of the projector lamp.

It is frequently necessary, in optical applications, to subject the outer surfaces of the glass plates to grinding under substantial pressure. Some previously known laminated glass has been subject to the objection that the grinding of the blanks produced optical defects in the inner layer because of springing of the glass as a result of compression during grinding.

It is a major object of the present invention to provide an optical lamination with a very thin plastic interlayer of predetermined thickness.

It is a further object of this invention to provide a method for making optical laminations in which both resin and plasticizer are dissolved together in a solvent mixture and deposited as such entirely on one plate of the two which are to be bonded into a single lamination.

It is still another object to provide a method of centrifugally spreading said solution over said first plate in a perfectly smooth and unflawed layer.

It is another object to provide a clear or colored glass lamination which is unaffected by temperatures of over 200° F.

These objects are accomplished by a method which involves spreading the solution of resin and plasticizer horizontally over a plate of glass spun at several hundred revolutions per minute in a horizontal plane (or, in the case of a curved element, in a substantially horizontal plane). Solvents which it is practical to use in methods of the present type are necessarily very volatile so that the instant the solution is exposed to air it rapidly begins to loose some of its solvent content and to solidify into a skin. As the material flows over the surface of the glass plate, flow takes place under the surface of a constantly forming skin; if this flow is momentarily interrupted a ridge is formed which cannot be removed by any practical means without destroying the film. Any droplet which flies off during the process of centrifugal spreading tends to draw after it a thin thread of rapidly solidifying plastic material. The major difficulties encountered in centrifugal spreading have been those of forming a coating entirely free of ripples, threads, or other irregularities.

Attempts have been made to prevent the generation of threads by using processes that did not involve an initial solvent mixture of both resin and plasticizer. Other attempts have been made to prevent the return of threads to the film surface by covering the plate spinning or by otherwise attempting to divert the circulation of air over the surface of the plate from returning the threads to the plastic film surface.

The present invention makes it possible to use an initial solution of both resin and plasticizer despite the greater tendency of said solution to form threads than the solution of the resin alone. It has been found unsatisfactory to rely upon the circulation of air induced over the surface of the plate by the spinning thereof to remove these threads, and the present method involves the novel feature of positively pumping air away from the edges of the spinning plate and thereby augmenting the flow of gas which entrains the threads and carries them away from the newly formed film surface. In its preferred form, the process is carried out without any interruption in the flow of the resin-plasticizer solution. A portion of this solution is poured onto the central region of the plate surface while the plate is stationary. After pouring has been completed, but before radial flow of the plastic resin solution has discontinued, spinning is begun and continued until the solution has been spread in a thin film over the surface of the plate. Simultaneously, a current of air (or other gas) is continuously pumped downwardly over the central region of the plate, radially outward over its face, and downwardly at its outer edges.

In previously known methods of manufacturing laminated glass with a plastic interlayer applied in liquid form, it has been necessary to coat both lamination plates. In the present method however, only one plate need be coated with the plastic film. The coated plate is then heated to drive off the solvent content of the film and a second plate is laminated to the first, and bonded under elevated temperature and pressure.

Another novel feature of the present process relates to the steps for bringing the second plate into intimate contact with the first plate prior to the bonding treatment. During the formation of the film by centrifugal spreading on the first plate, a slightly raised edge or bead is formed at the outer limits of the film. To avoid interference from this bead, the second plate is cut of smaller dimensions than the first and fixed within the area described by the bead. The two plates are then passed between a pair of rubber rollers to securely position them and to expel stray air. Any remaining air or moisture is eliminated during the bonding step.

A specific embodiment of the process of this invention, and of an apparatus for carrying it out, is described in the following paragraphs in connection with the accompanying drawings, in which:

Figure 1 is a pictorial representation of the steps of the process beginning with centrifugal spreading (after the mixing of the solution of resin and plasticizer in solvent); and ending with a typical completed production; and Figure 2 is a vertical sectional view, shown in perspective, of a centrifugal spreader for carrying out the centrifugal spreading step of the process.

The present process is uniquely suited for making an optical lamination of two sheets of glass with an interlayer of polyvinyl butyral, incorporating a suitable plasticizing oil. Instead of glass, optical elements of other glass-like materials having suitable optical properties might be employed as the laminating plates; and any thermo-plastic resin having suitable optical properties, good adherence to the supporting plates, stability under conditions of use, might be employed. However, the process has been found uniquely suitable to the vinyl resins, and particularly polyvinyl butyral.

In solutions suitable for spinning, it will be found that for each part of resin, between ⅕ and 1 part of plasticizer is required, and between 4 and 20 parts of solvent are required.

In the pictorial illustration of Figure 1 the first step shown is that of centrifugal spreading, carried out in a centrifugal spreader 10 of novel design, which may conveniently be in the form of a vertical cylinder with the upper end at about table height, and a diameter sufficiently large to accommodate the largest plate which is to be spun in the device. A convenient size of plate for use in manufacture of photographic filter elements, the field in which the present process finds its widest application, is about 13 x 13 inches of ⅛-inch plate for the first plate, i. e., the one to which the resin coating is applied, and 12 x 12 inches for the second plate, i. e., the bare plate which is bonded to the plastic coated first plate. The centrifugal spreader 10 is large enough to accommodate the first plate of 13 x 13 inches, having a diameter of about 30 inches at its upper end. It will be understood that larger plates would require a substantially larger centrifugal spreader, a somewhat lower rate of spinning revolutions, and a somewhat less viscous charge of plastic solution than those described in the present specific embodiment. With centrifugal spreader 10 at rest, a plate 11 is placed in the position indicated at 12, and a single charge of plastic resin solution 13, prepared in a manner to be described hereinafter, is poured on the plate at about its center. After the plastic solution 13 has been emptied entirely onto the plate 11, but before the solution has discontinued its radial flow outwards from the point of pouring toward the edges of the plate, a manual switch 14 is thrown to begin the spinning of the spinning table 15, seen in Figure 2, of the centrifugal spreader 10.

The same switch operation turns on a blower 16 which exhausts air from the interior of the centrifugal spreader 10 at a high rate so as to produce a current of air over the upper surface of the spinning plate 11 in a manner to be described hereinafter.

In the sectional view of Figure 2 centrifugal spreader 10 is seen to have a cylindrical housing 17, the lower portion of which provides an annular air duct 18 communicating through a conduit 19 with an exhaust blower 16.

A centrally located housing 20, encloses a pulley 21 mounted on a vertical shaft 22, a motor means 23 with a pulley 23a drives pulley 21 by means of V belts 24 illustrated.

The shaft 22 is journalled in housing 20 in upper and lower bearing 25 and 26.

The spinning table 15 is mounted on the upper end of shaft 22, and rotates therewith. The upper part of the cylindrical housing 17 of the centrifugal spreader 10 encloses an annular space encircling the spinning table 15, providing a protective guard and rotating parts and an enclosed chamber 27 by means of which air can be pumped from the periphery of the spinning table.

Preferably, the spinning table 15 is bowl shaped, with smoothly curved and slightly overhanging edge walls 28, within which a plate supporting spider 29 is supported a short distance above the bottom 30 of the spinning table. The plate 11 indicated by the dashed line is supported on the plate supporting spider 29 by means of small locating pins 31.

In the center of the bottom 30 of spinning table 15, openings 32 are provided to permit the movement of air withdrawn from spinning table 15 downwardly into the interior of cylindrical housing 17 and thence to the exhaust conduit 19.

The rotation of plate 11 on spinning table 15 generates a natural circulation of air radially outward over its surfaces. Normally, this air would descend toward the center of plate 11, as indicated by the arrows 33, and would pass outwardly and then upwardly and back over the plate 11 again, depositing any entrained threads of plastic materials thrown off during the process of centrifugal spreading. Attempts to partially cover plate 11 during spinning are inconvenient and are not effective unless the cover is so close to the spreading plastic film as to risk contact therewith. Moreover, there is a tendency for some of the spattered plastic to return from the under surface of the cover plate to the surface of the plastic film, thereby damaging its smooth surface. In the present process, however, the problem of threading of the viscous plastic solution is overcome by continuously pumping air away from the periphery of the spinning plate 11, and withdrawing said air downwardly under plate 11 and through the central opening 32 in the center of the spinning table 15. This movement of air is produced by a centrifugal blower arrangement comprised of radial vanes 34 which project from shaft 22 within cylindrical housing 17 and impart a centrifugal acceleration to the air therein causing a flow in the direction of arrows 35, 36, and 37 to the annular air conduit 18 from which the air is continually exhausted by blower 16.

It will be seen from this arrangement that the natural currents of air generated over the upper surface of the spinning plate 11 are not relied upon for the removal of the threads generated during centrifugal spreading. Instead, a current of air for entraining said threads is generated by continuously pumping air away from the edges of the spinning plate and downwardly to its under side, preferably, toward the central region of its under surface, from which there is no chance that air tossed threads may fall upon the exposed plastic film and produce optical defects therein.

Naturally, the entire process, including the centrifugal spreading operation, must be carried out in a room which is as free as possible of dust particles, and in which the humidity is preferably less than 40%. High humidity may result in the deposition of moisture on the plastic film surface, and although subsequent steps of the process are adapted to eliminate such moisture, the presence of any excessive amount of moisture content in the air is likely to increase the rate of spoilage.

Spinning of the plate will normally be in the range of between 300 and 2500 rotations per minute, for a period between 3 and 20 seconds.

After spinning, the newly formed plastic film is tacky to the touch, and easily damaged. It is therefore promptly transferred to the next step which is a process of slow heating to a temperature substantially above the boiling points of the solvents employed to drive off the solvent content. The most reliable method of accomplishing this is by means of conveyor drying, as indicated in the conveyor 38 of Figure 1. Plate 11 is moved to the charging end of conveyor dryer 38 and placed on a conveyor belt 40, plastic coated face up, under infra-red lamps indicated by dashed line 41, and it is seen that the lamps are spaced above the conveyor belt 40 a distance which diminishes as the discharge end 42 is approached. This insures that the coated plate is only mildly heated initially, when its solvent content is at a maximum, and is subjected to an increasing temperature as it nears the discharge end 42. A blower 37a continuously removes hot air and solvent vapors from the dryer 37. Exposure of the freshly coated plate 11 to too high a temperature initially tends to produce blistering as solvent is evolved rapidly from the plastic film with damage thereto.

The coating thus produced is usually about .0075" thick. However, thinner layers may be produced using less polymerized resin and/or more solvent or plasticizer oil. Thicker coatings are best produced by applying several layers. The range of coating thickness for which this process is best adapted is from .0002 to .006 inch.

If only one coating layer is to be applied, a second plate indicated at 43 is placed on the conveyor belt 40 immediately following the plastic coated plate 11, so that it is heated to the same temperature as the plate 11 by the time the latter reaches the discharge end 42 of the conveyor drier 37. While both plates are still hot and at substantially the same temperature, the second plate is laminated to the first, as indicated at 44 by placing one edge of the second plate on the plastic coated surface and dropping the upper plate 43 into position within the beaded edge of the plastic film.

The two plates then pass, without more than a few seconds' delay, to a pair of rubber rollers 45 through which they are rolled under a low pressure of a few pounds per square inch in order to press them firmly into place and produce a temporary bonding sufficient to keep the two plates in relative position until they are finally bonded under elevated temperature and pressure in the next subsequent step.

Following rolling, several uncured laminations may be mounted in a frame 46 and carried by overhead tram rail 47 to an autoclave 48. The top 49 of autoclave 48 is removed and frame 46, carrying a load of uncured laminations is lowered into the autoclave. Top 49 is refastened in place and oil within the autoclave 48 is brought up to a bonding temperature of between 170° and 370° F., but preferably over 200° F., by circulation of steam as indicated at 50 through a steam jacket 51, which jackets the autoclave. The plastic does not soften enough to permit the escape of air, unless about 170° F. is reached. Dyes deteriorate at temperatures of about 350° F. up and the plastic coating itself is affected at about 400° F. At the same time, a compressor 52 introduces air under pressure into the lower part of autoclave 48 to build up pressure therein, indicated by gauge 53, to a bonding pressure between 50 p. s. i. and 400 p. s. i. but preferably over 200 p. s. i. Too low a pressure fails to drive out the residual air between the plates. Too high a pressure deforms the glass and the interlayer and produces optical irregularities.

It is desirable that the oil within autoclave 48 be agitated so as to uniformly and rapidly raise the temperature of the entire oil bath, and prevent any local regions of relatively high or low temperature. This agitation may be accomplished by paddles or any other suitable means or, in the method illustrated, a certain amount of air may be continuously bled off through valve 54 so that the passage of air through the oil bath produces the desired agitation.

After temperature and pressure have been attained in the autoclave it is usually desirable to allow a few minutes to pass while the laminated glass is heated completely through and the plastic interlayer is somewhat softened and completely freed of any remaining air or moisture. The bonding temperature should always exceed that temperature which the lamination is expected to be exposed to during use. It is especially desirable that the lamination be heated to a temperature well over 212° F. so as to insure the removal of all traces of moisture.

After the lapse of about ten minutes or so, the exact time depending principally upon the thickness of the glass laminations which must be heated, the top 49 is removed and the frame 46 is lifted out and carried along tram rail 47 to a degreasing bath 54a in which the oil is washed from the laminated plates.

The clean plates are then taken to storage or to blanking at 55, in which step any suitable blanking machine such as a core driller 56 may be used to cut out blanks of the proper diameter.

These blanks may either be optically finished or directly mounted, depending upon the end use to which they are to be put. A typical mounted product is shown at 57. A laminated glass blank 58 is received within a cylindrical holder 59 in which it seats upon a manual shoulder not shown. A metal or plastic retaining ring 59a is then inserted and cemented into place. If desired, the retaining ring 59a may then be machined to contour smoothly into the internal side walls of holder 59.

The application of the invention may be further illustrated by the following examples which are typical of the many laminated products which have already actually been produced by the method of this invention.

*Example 1*

Over 2,000 photographic filters 50 mm. in diameter, and having a characteristic selective light absorption found experimentally with trial gelatin filters were required. The experimental filter was subjected to a spectro-photometric examination and a curve was produced with a percentage transmittance plotted against wave lengths in millimicrons. A dye was then selected having the same general spectro-photometric character, and an estimate, based on previous experience with the same or similar dyes was made as to about the quantity of dye required for making the desired plastic and glass laminated filter.

A mixture was then made of:

2,500 grams of solvent comprised of 1,000 grams of toluene and 1,500 grams of methanol (the latter including about 5% water)
330 grams of powdered vinyl butyral
140 grams of plasticizer oil (triethylene glycol di-2-ethylbutyrate, known as 3 GH plasticizer)

About 8 grams of dye were added and the mixture was allowed to stand overnight. The following day 60 clean dry glass plates ⅛ inch thick, and 13 inches by 13 inches were prepared for coating. In addition, 60 glass plates 12 by 12 and ⅛ inch thick were prepared for laminating as second plates.

The plastic solution was then filtered through a funnel into 60 small charge bottles, one for each of the 60—13 x 13 plates, each charge portion being about 50 grams. Each charge portion bottle was carefully capped for temporary storage and not opened until immediately prior to pouring on the glass plate.

A 13 x 13 inch glass plate was placed on the centrifugal spreader at room temperature, and one charge portion of plastic solution was poured on the plate at its center point approximately as judged by eye. After the entire charge portion had been emptied onto the plate, but before the outward flow of the expanding glob of plastic had stopped, i. e. within two or three seconds, the control switch of the centrifugal spreader was thrown and the plate was brought up to a spinning speed of about 500 rotations per minute, while the pump and blower combination under the plate produced a flow of air over its surface at a rate of about 2,000 cubic feet per minute. After about ten seconds of spinning, the plastic solution had spread over the 13 x 13 inch glass plate, overflowing the centers of its sides and almost reaching the corners. Spinning was stopped and the plate transferred at once to the charging end of a conveyor dryer.

A 12 x 12 inch second plate was then placed on the conveyor dryer belt immediately following the 13 x 13 inch coated first plate. Infrared lamps of about 1,000 watts power were suspended ten inches over the upper surface of the plate near the charging end. Additional 1,000 watt lamps were placed along the entire length of the conveyor dryer, about 40 feet, descending every few feet until the lamps near the discharge end of the conveyor dryer were only 2 inches from the surface of the plate. The temperature of the 2 plates upon withdrawal from the conveyor furnace was about 260° F. They required about 12 minutes to move through the conveyor dryer, and a current of air was continuously passing over them removing solvent vapor.

The 13 x 13 inch plate (11) was then laid on a table, coated side up, and one edge of the 12 x 12 inch plate (43) was placed on its upper surface, parallel with one edge and about one inch from the edges. The second plate (43) was then allowed to drop on to the first plate (11) somewhat after the manner of closing a hinged door. The plates were at about 240° F. at this point. The two plates were then passed between a pair of rubber squeegee rollers under a pressure of about 8 pounds per square inch and pressed into contact with the uncured plastic film.

The lamination was then placed in the autoclave and heated to a temperature of 285° F. under a pressure of 200 pounds per square inch. After both temperature and pressure had been attained in the autoclave, they were maintained for a period of ten minutes. The autoclave was then opened, the plate was cleaned, and one optical blank was cut and run through the spectrophotometer. The resulting photometric curve revealed that the filters were somewhat too opaque, it was therefore necessary to remix the plastic mixture to reduce the dye content to about 6 grams per 100 plates, which subsequent tests proved to be adequate. The remaining plates were then run exactly as previously described except with altered dye content.

*Example 2*

The steps in this process were substantially the same as in the foregoing except as follows: Both plates were 20 inches by 20 inches and .090 inch thick. The charge portion of plastic solution was increased to 200 grams. The first plate was spun at a rate of 800 rotations per minute for fifteen seconds.

After spinning and before placing the plates in the conveyor dryer, the beaded edge of the plastic film of the coated first plate was removed by means of a razor-like trimming knife, in order to permit intimate contact of the second plate over the entire plastic film surface.

This lamination was bonded by suspending it in hot air under pressure for ten minutes, at the same temperature and pressure as in Example 1, but without oil.

*Example 3*

In this example, the steps were similar to those in Example 1 except that the plastic solution employed was comprised of: 1,000 grams of trichlorophane, 1,500 grams of methylethylketone, 500 grams of polyvinyl formal. No dye was placed in the mixture. About 140 grams of diethyl phthalate were used as plasticizer oil.

After the first plate had been coated by centrifugal spreading, it was run through the conveyor dryer and then returned to the centrifugal spreader. With the plate stationary, a second charge of the plastic solution was then poured on its surface and the spinning and drying steps were repeated. The second plate was then laminated to the first at the same temperature, i. e. 240° F. and subsequent steps were as described in Example 1.

Since the plates employed were $3/16$ of an inch thick and the double coating produced a plastic inner layer of about .006 inch in thickness, the plate produced was suitable for light-weight protective glass.

*Example 4*

A series of tinted filters of six different degrees of density of the same color were required, the difference between successive filters being equal to the density of the lowest density filter.

The steps were exactly as in Example 1, except that three sets of plates were made, one set with a single layer of plastic about .00075 inch thick, a second set with two equal layers, laid down successively, and a third set with three equal layers laid down successively.

The first three densities were made from the above by laminating a plate from each set with a bare plate.

The four layer lamination was made by combining two of the two-layer plates, the five layer by combining a three-layer and a two-layer plate, and the six layer by combining two three-layer plates.

The result was a perfect series of filters increasing in density in equal steps.

It will be obvious to those skilled in the art that each step of the method may be varied within a reasonable range when necessary for special purposes. For example, although the toluene and methanol mixture of Example 1 is the preferred mixture, various alcohols, ketones, and other organic solvents may be used. It is only necessary that a compatible mixture can be formed in order to place the plastic film on the surface of the plate without producing defects during the subsequent spinning and drying operations. Often, it will be necessary to include in the solvent mixture some component capable of dissolving a particular dye.

Although the invention relates to any tough thermoplastic resin of good optical qualities and capable of adhering to the laminating materials used, the process is uniquely applicable to the polyvinyl butyral resins. Polyvinyl acetate, cellulose acetate, cellulose nitrate or acrylic resins such as butyl methacrylate or mixtures may be used. Polyvinyl chloride may be used with plastic laminations. With all mixtures, emphasis should be on adhesive quality and compatibility with other ingredients, such as the color pigments.

The preferred plasticizer oil for the polyvinyl resin, is that known commercially as 3 GH plasticizer, which is principally triethylene glycol di-2-ethylbutyrate. However, diethylphthalate and methylcellulose phthalate may also be used.

I have found that the rate of spinning, the duration of spinning, and the thickness of coating are interrelated and can be varied relative to one another to achieve a desired result on a given machine. Viscosity also is a factor, but it is less helpful as a variable, since too low a viscosity increases surface spoilage; and too high a viscosity prevents the material from spreading to the edge unless excessive speeds are used.

While I have illustrated and described one specific embodiment of my invention, and in addition have given four numerical examples of its use, it will be understood that the invention is not restricted to either the embodiment or the examples, but includes all the many variations obvious to those skilled in the art, but falling within the scope of the appended claims.

I claim:

1. A method for making an optical lamination which includes the steps of: pouring a plastic solution on the central part of a first optical element; spinning said first element about an axis through said central part to centrifugally spread said plastic solution as a thin coating on the surface of said first element; exhausting gas over said spreading coating by blowing it from the peripheral region of said spinning first element to remove particles thrown off by said spreading coating; laminating a second optical element to the coated surface of said first optical element; and subjecting said lamination to softening temperature over 170° F. and elevated pressure to expel residual air from between said first and second optical elements.

2. A method for making an optical lamination which includes the steps of: forming a solution of resin and plasticizer in a relatively volatile solvent; pouring said solution on the central part of a horizontally disposed first optical element; spinning said first optical element about an axis through said central part to centrifugally spread said plastic solution as a thin coating on the surface of said first element; exhausting gas downwardly from the peripheral region of said spinning first element to remove particles thrown off by said spreading coating; evaporating solvent from said coating; laminating a second optical element to the coated surface of said first optical element; and subjecting said lamination to elevated pressure at temperatures sufficient to soften the plastic material between the two elements to expel residual air from the interlayer of said lamination.

3. A method for making laminated optical glass which includes: forming a solution of polyvinyl resin and plasticizer in a relatively volatile organic solvent therefor; pouring said solution on the central part of a horizontally disposed first glass plate; spinning said first plate about a substantially vertical axis through said central part to centrifugally spread said plastic solution as a thin coating on the surface of said plate, said spinning being started before outward flow of said plastic solution has stopped; exhausting air downwardly from the periphery of said first plate to maintain a flow of air radially outward over said plate and downward over its edges at a rate sufficient to carry away from said coating any threads of plastic thrown off by said flowing solution; heating said first plate to evaporate the solvent content of said coating; laminating a second glass plate to the coated surface of said first glass plate; and heating said lamination under pressure to soften said inter-layer and expel residual air from between the laminations.

4. A method for making laminated optical elements which includes: forming a solution of polyvinyl butyral resin and plasticizer in a relatively volatile solvent; pouring a quantity of said solution on the central part of a horizontally disposed first glass plate; spinning said first plate about a subtantially vertical axis through said central part to centrifugally spread said solution over said plate in a coating between .0002 and .0006 inch thick; exhausting air from under said plate to maintain a flow of air radially outward over said plate and downward over its edges at a rate sufficient to carry away from said coating any threads of plastic thrown off by said flowing solution; heating said first plate in a current of air to a temperature sufficient to evaporate said solvent, laminating a second glass plate to said first glass plate and in intimate surface contact with said plastic coating; heating said lamination to a temperature in a range between that at which said coating softens and that at which its constituents deteriorate in an autoclave and submerged in a liquid under a pressure between 50 pounds per square inch and 400 pounds per square inch; and cutting optical elements from the portions of said lamination free of defects.

5. A method for making laminated optical glass which includes the steps of: forming a plastic solution comprised principally of polyvinyl butyral, plasticizer, and a solvent mixture comprised principally of an alcohol and a aromatic hydrocarbon, the proportion of resin and the degree of its polymerization being selected to produce a desired coating thickness; pouring a quantity of said solution on the central part of a first glass plate; spinning said plate in its own plane about a normal axis through said central part; exhausting air downwardly from the periphery of said first plate to maintain a flow of air radially outward over said plate and downward over its edges at a rate sufficient to carry away from said coating any threads of plastic thrown off by said flowing solution; heating said coated first plate to evaporate solvent; heating a second glass plate; laminating said two plates while they are at substantially the same elevated temperature; and heating said lamination to temperature above the boiling point of water and a pressure above 150 pounds per square inch to expel residual air from the coating interlayer.

6. A method for making laminated optical glass which includes the steps of: forming a solution comprised principally of one part polyvinyl resin, between one fifth part and one part of plasticizer, between four parts and twenty parts of solvent; pouring a quantity of said solution on the central part of a first glass plate; spinning said first plate about a normal axis through said central part to centrifugally spread said solution as a thin coating on the upper surface of said plate; continuously exhausting fluid from the edges of the coated surface during spinning to establish a scavenging current of air flowing radially outward over the coated surface of said plate and away from said edges to entrain and remove threads of plastic thrown off during spinning; drying said coating on said first plate; heating a second glass plate; laminating said second glass plate to the coated surface of said first glass plate while both of said plates are at substantially the same elevated temperature; and heating said lamination under pressure to soften said plastic coating between said plates and expel residual air therefrom.

7. A method for making glass laminations which includes the steps of: forming a solution comprised principally of one part polyvinyl resin, between one fifth part and one part of plasticizer, and between four parts and twenty parts of solvent; pouring a quantity of said solution on the central part of a horizontally disposed first glass plate; spinning said first plate about a substantially vertical axis through said central part to centrifugally spread said solution as a thin coating on the upper surface of said plate, said spinning being started before outward flow of said plastic solution has stopped; continuously exhausting fluid from the periphery of said spinning first plate to establish a scavenging current of fluid flowing radially outward over the coated surface of said plate and away from its edges to entrain and remove threads of plastic thrown off during spinning; drying said coating on said first plate; heating a second glass plate; laminating said second glass plate to the coated surface of said first glass plate while both of said plates are at substantially the same elevated temperature; and heating said lamination to a temperature between 170° F. and 370° F. while submerged in a liquid under pressure between 50 pounds per square inch and 400 pounds per square inch to soften said plastic coating between said plates and expel residual air therefrom.

8. A method for making laminated optical glass which includes the steps of: forming a solution comprised principally of one part polyvinyl resin, between one fifth part and one part of plasticizer, between four parts and twenty parts of solvent; pouring a quantity of said solution on the central part of a first glass plate; spinning said first plate about a normal axis through said central part to centrifugally spread said solution as a thin coating on the upper surface of said plate; continuously exhausting fluid from the edges of the coated surface during spinning to establish a scavenging current of air flowing radially outward over the coated surface of said plate and away from said edges to entrain and remove threads of plastic thrown off during spinning; drying said coating on said first plate; heating a second glass plate; laminating said second glass plate to the coated surface of said first glass plate while both of said plates are at substantially the same elevated temperature; passing said plates between a pair of rollers to securely position them and expel air; and heating said lamination under pressure to soften said plastic coating between said plates and expel residual air therefrom.

9. A method for making laminated glass which includes the steps of: forming a solution comprised of polyvinyl butyral resin, plasticizer, and a solvent mixture comprised in part at least of an aromatic hydrocarbon; pouring a portion of said solution on the central part of a horizontally disposed first glass plate; spinning said first plate about a vertical axis through said central part to centrifugally spread said solution as a thin coating on the upper surface of said plate, said spinning being started before outward flow of said plastic solution has stopped, and maintained at least 300 revolutions per minute until said solution spreads over the surface of said first plate in a thin coating; continuously exhausting air from under the central part of said spinning first plate to establish a scavenging current of air flowing radially outward over the upper surfaces of said plate and downwardly over its edges to entrain and remove threads of plastic thrown off during spinning; drying said coating on said first plate by passing it through a current of air to a temperature gradually increasing to a value in excess of the boiling points of the constituents of said solvent mixture; heating a second glass plate; laminating said second glass plate to the coated surface of said first glass plate while both of said plates are at substantially the same elevated temperature; and heating said lamination to a temperature between 170° F. and 370° F. under pressure between 50 pounds per square inch and 400 pounds per square inch to soften said plastic coating between said plates and expel residual air therefrom.

10. A method for making laminated glass which includes the steps of: forming a solution comprised of polyvinyl butyral resin, plasticizer, and a solvent mixture comprised in part at least of an aromatic hydrocarbon; pouring a portion of said solution on the central part of a horizontally disposed first glass plate; spinning said first plate about a vertical axis through said central part to centrifugally spread said solution as a thin coating on the upper surface of said plate, said spinning being started before outward flow of said plastic solution has stopped, and maintained at least 300 revolutions per minute until said solution spreads over the surface of said first plate in a thin coating; continuously exhausting air from the periphery of said spinning first plate to establish a scavenging current of air flowing radially outward over the upper surfaces of said plate to entrain and remove threads of plastic thrown off during spinning; drying said coating on said first plate; returning said first plate to said spinning step and adding another coating on the first one, and repeating said drying step; heating a second glass plate; laminating said second glass plate to the coated surface of said first glass plate while both of said plates are at substantially the same elevated temperature; and heating said lamination to a temperature between 170° F. and 370° F. under pressure between 50 pounds per square inch and 400 pounds per square inch to soften said plastic coating between said plates and expel residual air therefrom.

11. A method for making laminated glass which includes the steps of: forming a solution comprised of polyvinyl butyral resin, plasticizer, and a solvent mixture comprised in part at least of an aromatic hydrocarbon; pouring a portion of said solution on the central part of a horizontally disposed first glass plate; spinning said first plate about a vertical axis through said central part to centrifugally spread said solution as a thin coating on the upper surface of said plate, said spinning being started before outward flow of said plastic solution has stopped, and maintained at least 300 revolutions per minute until said solution spreads over the surface of said first plate in a thin coating; continuously exhausting air from the periphery of said spinning first plate to establish a scavenging current of air flowing radially outward over the upper surfaces of said plate to entrain and remove threads of plastic thrown off during spinning; drying said coating on said first plate; heating a second glass plate; laminating said second glass plate to the coated surface of said first glass plate while both of said plates are at substantially the same elevated temperature; rolling said plates together under moderate pressure; and heating said lamination to a temperature between 170° F. and 370° F. under pressure between 50 pounds per square inch and 400 pounds per square inch to soften said plastic coating between said plates and expel residual air therefrom.

12. A method for making laminated glass which includes the steps of: forming a solution comprised of polyvinyl butyral resin, plasticizer, and a solvent mixture comprised in part at least of an aromatic hydrocarbon; pouring a portion of said solution on the central part of a horizontally disposed first glass plate; spinning said first plate about a vertical axis through said central part to centrifugally spread said solution as a thin coating on the upper surface of said plate, said spinning being started before outward flow of said plastic solution has stopped, and maintained at least 300 revolutions per minute until said solution spreads over the surface of said first plate in a thin coating; continuously exhausting air from the periphery of said spinning first plate to establish a scavenging current of air flowing radially outward over the upper surfaces of said plate to entrain and remove threads of plastic thrown off during spinning; drying said coating on said first plate; trimming the edges of said coating to remove any bead projecting from the coated surface of said first plate; heating a second glass plate; laminating said second glass plate to the coated surface of said first glass plate while both of said plates are at substantially the same elevated temperature; and heating said lamination to a temperature between 170° F. and 370° F. under pressure between 50 pounds per square inch and 400 pounds per square inch to soften said plastic coating between said plates and expel residual air therefrom.

13. A method for making photographic filters which includes the steps of: forming a solution comprised of one part polyvinyl butyral resin, between one fifth part and one part of plasticizer, and between four parts and twenty parts of a solvent mixture comprised principally of toluene and methanol; pouring a portion of said solution on the central part of a horizontally disposed first glass plate; spinning said first plate about a vertical axis through said central part to centrifugally spread said solution as a thin coating on the upper surface of said plate, said spinning being started before outward flow of said plastic solution has stopped, and maintained at least 300 revolutions per minute until said solution has spread over said first plate in a coating between .0002 and .006 inch thick; continuously exhausting air from under said spinning first plate to establish a scavenging current of air flowing radially outward over the upper surfaces of said plate and downwardly over its edges to entrain and remove threads of plastic thrown off during spinning; drying said coating on said first plate by passing it through a current of air to a temperature gradually increasing to a value in excess of the boiling points of the constituents of said solvent mixture; heating a second glass plate; laminating said second glass plate to the coated surface of said first glass plate while both of said plates are at substantially the same elevated temperature; and heating said lamination to a temperature between 170° F. and 370° F. under pressure between 50 pounds per square inch and 400 pounds per square inch to soften said plastic coating between said plates and expel residual air therefrom.

14. A method for making photographic filters which includes the steps of: forming a solution comprised of one part polyvinyl butyral resin, between one fifth part and one part of triethylene glycol di-2-ethyl-butyrate plasticizer, between four parts and twenty parts of a solvent mixture comprised principally of toluene and methanol, and a fractional part of dye soluble in said solvent mixture; pouring a portion of said solution on the central part of a horizontally disposed first glass plate; spinning said first plate about a vertical axis through said central part to centrifugally spread said solution as a thin coating on the upper surface of said plate, said spinning being started before outward flow of said plastic solution has stopped, and maintained at least 300 revolutions per minute until some of said solution begins to flow over the edges of said first plate; continuously exhausting air from under the central part of said spinning first plate to establish a scavenging current of air flowing radially outward over the upper surfaces of said plate and downwardly over its edges to entrain and remove threads of plastic thrown off during spinning; drying said coating on said first plate by passing it through a current of air to a temperature gradually increasing to a value in excess of the boiling points of the constituents of said solvent mixture; heating a second glass plate to a temperature not higher than that of said first glass plate, said second glass plate being sufficiently small in dimensions to fall within the beaded edge of said coating on said first glass plate; laminating said second glass plate to the coated surface of said first glass plate while both of said plates are at substantially the same elevated temperature; and heating said lamination to a temperature between 170° F. and 370° F. under pressure between 50 pounds per square inch and 400 pounds per square inch to soften said plastic coating between said plates and expel residual air therefrom.

15. A method for making a photographic filter as described in claim 14 in which the dye content of said solution is substantially less than that required to produce the desired filter character in a single coating, and the desired filter density is produced by laying down several layers of coating, each less than one-thousandth inch in thickness, and each being dried before the deposition of its successor.

References Cited in the file of this patent
UNITED STATES PATENTS

| | | |
|---|---|---|
| 2,386,591 | Campbell | Oct. 9, 1945 |
| 2,632,725 | Marks et al. | Mar. 24, 1953 |